United States Patent Office 3,197,959
Patented Aug. 3, 1965

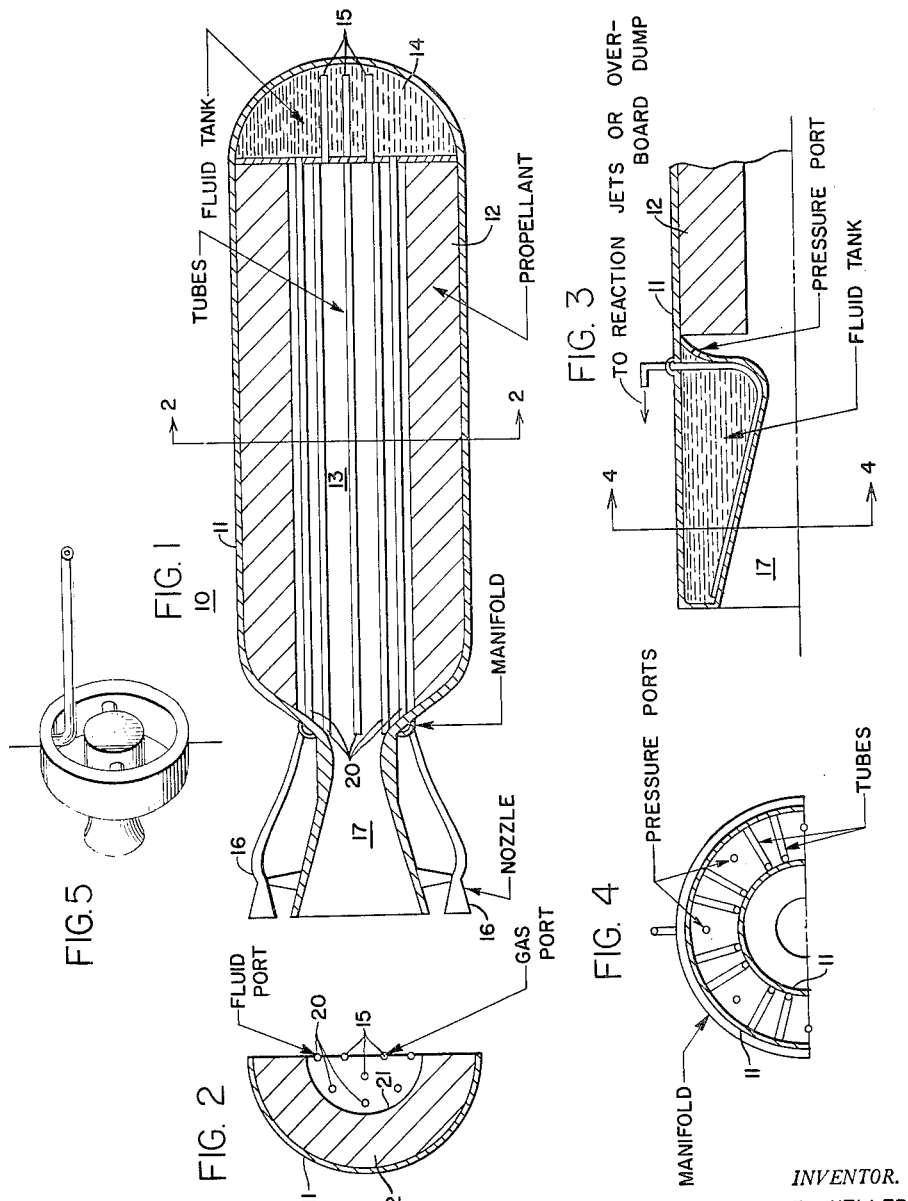

3,197,959
CONTROL APPARATUS
Walter F. Keller, Los Angeles, Calif., assignor to
Honeywell Inc., a corporation of Delaware
Filed Aug. 22, 1960, Ser. No. 51,160
5 Claims. (Cl. 60—35.54)

This invention pertains to control apparatus for jet or rocket powered vehicles or missiles which are provided with reaction means for thrust vectoring or steering such vehicles. In particular, the invention relates to a novel thrust vector control system for a solid fuel powered rocket vehicle for controlling attitude thereof.

Heretofore liquid propellant rocket motors have been able to provide attitude control through the use of auxiliary liquid fuel rocket motors or chambers. On the other hand solid fuel rocket propellant vehicles have required a separate thrust vectoring or attitude control system. Such attitude control system might comprise a source of pressure provided prior to flight, or a gas generator such as hydrogen peroxide, which gas during attitude control issued from nozzles suitably provided to control attitude.

An object of this invention is to provide a novel thrust vectoring arrangement for solid fuel propellant vehicles which is self-contained and derives its own control pressure while in flight.

A further object of this invention is to provide a rocket motor with a self-contained liquid which is vaporized by the rocket motor to provide attitude control of a vehicle.

It is a further object of this invention to provide a solid fuel powered rocket motor with a self-contained arrangement for vaporizing a liquid by said motor for operating auxiliary reaction means on the vehicle to control attitude.

It is a further object of this invention to provide a solid fuel powered rocket motor vehicle with a self-contained arrangement for vaporizing a liquid by the heat of combustion in said motor, said vapor operating auxiliary means on the vehicle.

The above and other objects of the invention will be apparent from a detailed description of the invention set forth hereinafter when considered with the accompanying drawings in which:

FIGURE 1 is a longitudinal cutaway view of the novel solid propellant rocket motor;

FIGURE 2 is a cross-section thereof;

FIGURE 3 is a modification showing the fluid tank at the rear of the vehicle; and FIGURE 4 is a section of the modification of FIGURE 3;

FIGURE 5 shows a nozzle 16 in a typical adjustable support.

The arrangement comprises an internally burning solid propellant rocket motor or engine having a main nozzle 17, a fluid to be vaporized by the heat of combustion in said rocket engine, an integrally constructed fluid storage tank, multiple tubing, and a set of four movable auxiliary reaction nozzles to control attitude, wherein the multiple tubing is used to connect the rocket engine chamber to the liquid or fluid storage tank and also to connect such tank with the movable nozzles. Such arrangement comprising a fluid provides a thrust vector control of a solid propellant rocket by a method as storable and reliable as the solid fuel powered motor itself.

While the vaporized liquid is utilized herein in the movable reaction nozzles, such vapor or gas may be utilized also at a manageable temperature to drive auxiliary power supply turbines or to power a servo actuated control system.

Vapor is generated by utilizing motor chamber pressure to force fluid from a storage tank located at the head end of the rocket through tubes in the center of the rocket or combustion area where sufficient heat is transferred to vaporize the fluid. Such vapor may be thence transmitted to the movable reaction nozzles.

Referring to FIGURE 1, the solid fuel propellant rocket or vehicle 10 comprises an outer casing 11 or body member. Contained within the body member 11 is a storage space 12 for the composite solid propellant fuel. The propellant grain will be of the case bonded, internally burning type. Radially inward therefrom is a combustion space 13. The body member 11 includes a liquid container 14 in the head end thereof. Short conduits or tubes 15 extend from the combustion chamber 13 and project for a substantial length into storage space 14. The body member includes adjustable reaction nozzles or reaction means 16 through which is exhausted a vapor for providing a reaction force at an angle to the longitudinal axis of the body member 11 to control attitude. Nozzles 16 may be of a conventional type wherein the nozzle can be pivoted about a horizontal axis and vertical axis as shown in FIGURE 5. Additional tubes 20 extend longitudinally from the storage section or container 14 to the nozzle 16, such tubes being arranged in the combustion chamber 13 for vaporization of the liquid in the tubes.

Initial fluid sealing between the ends of the tubes 15, 20 and the storage compartment 14 is provided by frangible sealing means such as metal burst diaphragms which are broken when subjected to pressure transmitted from the combustion chamber 13 due to the burning of the solid fuel propellant.

The products of combustion in the combustion chamber 13 pass through a main reaction motor nozzle section 17 of the rocket 10 to provide the main propellant thrust for the vehicle. The contour of the port or center hole 21, FIGURE 2 may be of a star shape rather than of the circular shape which is shown for simplicity.

A further application of this invention may be utilized for the purpose of cooling the nozzle of a reaction motor. Such nozzle of the motor may be identified as the portion 17 in FIGURE 1. As shown in detail in FIGURE 3, instead of storing the fluid at the head end of the rocket as in FIGURE 1 it may be stored in the back end of the rocket in a tank surrounding or enclosing the rocket motor nozzle 17 except for its ends. Within the fluid tank there is provided a fluid conduit opened at the rear end adjacent the back end of the rocket and extending forwardly and then upwardly to the reaction jets as indicated in FIGURE 3. As the rocket linearly accelerates as it is propelled forward, the inertia of the fluid tends to force it through the conduit or pipe, and it flows to the reaction jets. The fluid meanwhile is vaporized by the heat in the rocket motor nozzle, and it escapes through the reaction jets as a vapor to provide reaction powered attitude control. During the course of vaporization of the fluid, in the conduit adjacent the main nozzle wall, the rocket motor nozzle is also being cooled.

Additional pressure is applied to the fluid by the rupture of pressure ports, in the front end of the fluid chamber shown in FIGURES 3 and 4, in response to the pressure in the combustion chamber 13 as in FIGURE 1 due to the burning of the propellant.

In the arrangement of the fluid tank of FIGURE 3, the outer casing 11 of the rocket is continued rearwardly to the end of the rocket and has the same exterior dimensions that it has in the region of the combustion chamber 13.

Such application or utilization of the invention as shown in FIGURES 3 and 4 if applied to long operating rockets will result in a reduction in weight of the motor nozzle by the cooling effect since the nozzle construction may be less massive. Furthermore the basic design of the rocket may be altered thus to provide both nozzle cooling and reaction jet control.

Operation

After the propellant is ignited, pressure in chamber 13 acting through the short tubes 15 extending into the liquid storage chamber 14 slightly short of the front wall thereof will be utilized along with linear acceleration to force the fluid from the storage section 14 at the forward end of the body section 11 and through rearward conducting tubes 20. While passing through longitudinally extending tubes 20 which are exposed to the heat of the combustion chamber 13, the water therein will be vaporized and superheated by the heat of the rocket propellant combustion, as the water flows aft. It will be thereafter collected and exhausted through the nozzles 16. The resultant jet thrust from nozzles 16 may be directed mechanically at an angle to the longitudinal axis of the missile 10 thus providing control of the vehicle's attitude in flight.

Utilization of the motor combustion chamber pressure supplies an advantage in that it avoids the need for pumping and provides immediate fluid flow upon ignition of the rocket engine. Since the usual range of solid propellant operating pressures is between 400 and 2000 pounds per square inch, sufficient heat is always available. Such pressure is sufficient to burst the sealing means such as metal burst diaphragms present in tubes 15 and 20 at the storage section 14.

Another advantage of using combustion chamber pressure to propel the fluid is the low stress applied to the tube walls in that the stress will only be that due to the differential incurred by fluid flow and friction. This low stress will in turn permit operation at tube wall temperatures very close to the melting point of the material.

It will now be apparent that the present arrangement has advantages over the prior arrangements for attitude control of a solid fuel propellant rocket in that it may be used on any stage of a multi-stage missile and requires no ground preparation or power prior to launch; the reaction pressure and therefore the thrust from nozzles 16 does not decay with time and is available as long as the solid propellant motor is operational; an ultra-heavy pressure container which is often required in auxiliary thrust vectoring systems is not necessary; complete vaporization of the fluid from compartment 14 is insured and maximum performance thus obtained because of the combustion chamber temperatures and length of the large rocket motors requiring this type of control.

While preferred embodiments of the invention have been illustrated and described, it will be understood that various modifications thereof may be made without departing from the broader scope of the following claims.

I claim as my invention:

1. In a reaction propelled missile of the type having a guidance system and pay load, said missile comprising an external cylindrical casing having therein a solid fuel propellant, a combustion chamber generating gases from the propellant and thereby supplying energy to a main reaction nozzle, a liquid storage chamber, for a non-combustible liquid, adjustable auxiliary nozzle means for providing a steering thrust lateral to the longitudinal axis of said casing; pressure transmitting conduits extending from said combustion chamber to said liquid storage chamber to apply pressure thereto; and further conduits extending from said liquid storage chamber through a portion of said combustion chamber, for vaporization of said non-combustible liquid by heat in the combustion chamber by the passage of heat through the walls of the conduit, to said auxiliary nozzle means whereby a jet of vapor may be emitted or exhausted therefrom.

2. In a reaction powered dirigible vehicle comprising a casing having therein a fuel propellant combustion chamber connected to the vehicle main reaction nozzle, a non-combustible liquid storage chamber at the head of said casing, said vehicle including adjustable reaction means on the exterior of said vehicle for providing a steering thrust component lateral to the longitudinal axis of said casing and exterior thereof: pressure transmitting conduits extending from said combustion chamber to said liquid chamber, and exhaust conduits extending from said liquid storage chamber through a portion of said combustion chamber, for vaporization of said liquid in said conduits during combustion of said propellant to said reaction means for emission of attitude control vapor jets therefrom.

3. In a fuel propellant rocket having a main reaction nozzle and carrying its own propellant supply for free flight and having a plurality of steering control nozzles circumferentially disposed about the rocket exterior: a liquid confining chamber in the head of the rocket; a centrally located combustion space in said rocket; first means comprising a plurality of circularly spaced pressure transmitting tubes concentric with the longitudinal axis of the rocket and extending from the combustion space in said rocket and joined for communication to said liquid confining chamber; second means comprising a plurality of circularly spaced heat conducting tubes concentric with said axis and radially spaced from the previous tubes and extending from said liquid confining chamber through the combustion space to said steering control nozzles, whereby the fluid may be vaporized during combustion of the fuel prior to being delivered to said steering control nozzles.

4. The device of claim 3, and frangible diaphragms between the inner and outer circumferentially spaced tubes and said liquid confining chamber and broken upon application of pressure thereto from fuel combustion in said combustion space.

5. In a propellant vehicle carrying its own combustible fuel power supply for reactive propellant thrust from a propellant nozzle; a confining chamber in said vehicle arranged in surrounding relation about the reaction propellant nozzle of said vehicle for a liquid responsive to vehicle linear acceleration, fuel product combustion pressure transmitting means for communication between a combustion space in said vehicle and the liquid confining chamber; transmission means of the heat exchange type extending from said liquid confining chamber to reaction attitude control jets outwardly radially spaced from the propellant nozzle whereby said jets are controlled by liquid, responsive to both acceleration and pressure forces, and vaporized in said transmission means.

References Cited by the Examiner

UNITED STATES PATENTS

| | | | |
|---|---|---|---|
| 2,522,113 | 9/50 | Goddard | 60—35.6 |
| 2,544,422 | 3/51 | Goodard. | |
| 2,555,084 | 5/51 | Goddard | 60—35.6 |
| 2,916,873 | 12/59 | Walker | 60—35.54 |
| 2,943,821 | 7/60 | Wetherbee. | |
| 3,015,210 | 1/62 | Williamson et al. | 60—35.6 X |
| 3,036,430 | 5/62 | Eggers et al. | 60—35.54 |
| 3,069,850 | 12/62 | Ledwith et al. | 60—35.54 |

FOREIGN PATENTS

| | | |
|---|---|---|
| 1,048,093 | 12/58 | Germany. |
| 368,263 | 2/32 | Great Britain. |
| 820,427 | 9/59 | Great Britain. |

SAMUEL LEVINE, *Primary Examiner.*

ARTHUR M. HORTON, JULIUS E. WEST, ABRAM BLUM, *Examiners.*